Patented Sept. 15, 1936

2,054,609

UNITED STATES PATENT OFFICE 2,054,609

ELECTRODE OR WELDING ROD

Arthur Percy Strohmenger, London, England, assignor to The Quasi-Arc Company Limited, a corporation of Great Britain No Drawing. Application February 14, 1935, Serial No. 6,589. In Great Britain January 23, 1935

4 Claims. (Cl. 219—8)

This invention relates to electrodes or welding rods such as are employed in electric arc welding or the fusion deposition of metals. Most of the electrodes sold at the present time are provided with flux-forming coverings and frequently such coverings are applied as pastes containing iron oxide or iron powder, oxides of titanium, silicates of aluminium and the alkali metals, chalk, and deoxidizing alloys, such as ferro-manganese and ferro-titanium, together with carbonaceous material such as wood flour, and so forth.

It is highly desirable that such electrodes or welding rods should be capable of use with either alternating or direct current, and an important object of my invention is to improve the capacity of the electrode for being easily fused by alternating current. Another object of the invention is to provide an electrode which can be used with ease by an ordinary workman in alternating current welding. Moreover, it is highly desirable that such electrodes should be robust, so that the paste covering will remain intact if the electrodes are bent or roughly handled, and another object of my invention is to increase the robustness of the electrodes.

In proceeding according to my invention, I provide a paste coating with a covering constituted by a layer of thin paper made from a fibrous mineral silicate. This paper, which may be of the kind called "asbestos paper", tends to fuse after the paste is molten, so that in use a cup is formed at the end of the electrode. This leads to the maintenance of a high temperature at the centre of the core within the arc, because the loss of heat at that point is materially reduced, and accordingly the arc is far more stable, particularly with alternating current welding. Moreover, the paper serves to protect the paste from mechanical damage without introducing any undesirable characteristic or materially increasing the cost of the electrode.

The fushion point of the paper should be distinctly higher than that of the paste, and for this reason it is preferred to use a paper made of magnesium silicate, such as a paper consisting of at least 95% pure white asbestos with not more than 5% of a binding agent, such as sodium silicate. This paper may be about seven thousandths of an inch thick, which when calculated with respect to even the general minimum diameter of the metallic core of a welding rod such as three-sixteenths of an inch, which is commonly known and used in the art of welding rods, represents 3.7% of the diameter of the core. This percentage is even smaller when the metallic cores are of greater diameter, which is generaly the case.

As an illustration of the improvement brought about by the invention, a commercial electrode having a paste coating consisting of wood flour, sodium silicate, china clay and silica flour was used in alternating current welding at 60 volts P. D. The arc was most unstable, the fusion being accompanied by much spluttering, and there was no continuous flow of metal, so that the electrode could not be used in practice for alternating current welding at this potential difference. With an increase to 80 volts in the potential difference the fusion improved slightly, but the electrode was still unsuitable for commercial use. When, however, a layer of white asbestos paper was wrapped around an identical electrode and this was fused by an alternating current at 60 volts P. D., the arc was sufficiently stable for the electrode to be used commercially. Further, with the best paste-covered electrodes on the market at the present time such as those in which the paste consists of titanium dioxide, iron powder, and silica, the stability of the arc is improved by the application of an outer paper layer according to the invention, and while the improvement is most valuable in alternating current welding, it is distinctly noticeable in direct current welding also.

It is to be understood that the advantages of the invention are only obtained when the asbestos or like paper constitutes the outside of the electrode.

In manufacture, when the paste has been applied around the core, for instance by an extrusion process, the asbestos or like paper may be applied around the paste, for instance in a continuous process by a machine resembling those in which tobacco is wrapped in paper to make cigarettes. The wrapping of asbestos or like paper may be held in position by means of sodium silicate solution applied to the paste during the wrapping process. Longitudinal wrapping of this kind is preferable to helical wrapping, because there is less risk of displacing the paste during the wrapping process, i. e. the paste coating in the finished electrode is more uniformly distributed around the core.

I claim:—

1. An electrode or welding rod consisting of a metallic core, a flux-forming coating in paste form applied around the core and a covering around the flux-forming coating, the said covering consisting of a layer of pre-formed thin paper of a thickness less than 5% of the diameter of the metallic core made from a fibrous mineral silicate and constituting the outside of the electrode thereby to form a crater as the metallic core is melted.

2. An electrode or welding rod consisting of a metallic core, a flux-forming coating in paste form applied around the core and a covering around the flux-forming coating, the said covering consisting of a layer of pre-formed thin paper of a thickness less than 5% of the diameter of the metallic core made from a fibrous magnesium silicate and constituting the outside of the electrode thereby to form a crater as the metallic core is melted.

3. An electrode or welding rod consisting of a metallic core, a flux-forming coating in a paste form applied around the core and a covering wrapped longitudinally around the flux-forming coating, the said covering consisting of a layer of pre-formed thin paper of a thickness less than 5% of the diameter of the metallic core made from a fibrous mineral silicate and constituting the outside of the electrode thereby to form a crater as the metallic core is melted.

4. An electrode or welding rod consisting of a metallic core, a flux-forming coating in paste form applied around the core and a covering wrapped longitudinally around the flux-forming coating, the said covering consisting of a layer of pre-formed thin paper of a thickness less than 5% of the diameter of the metallic core made from white asbestos and constituting the outside of the electrode thereby to form a crater as the metallic core is melted.

ARTHUR PERCY STROHMENGER.